UNITED STATES PATENT OFFICE.

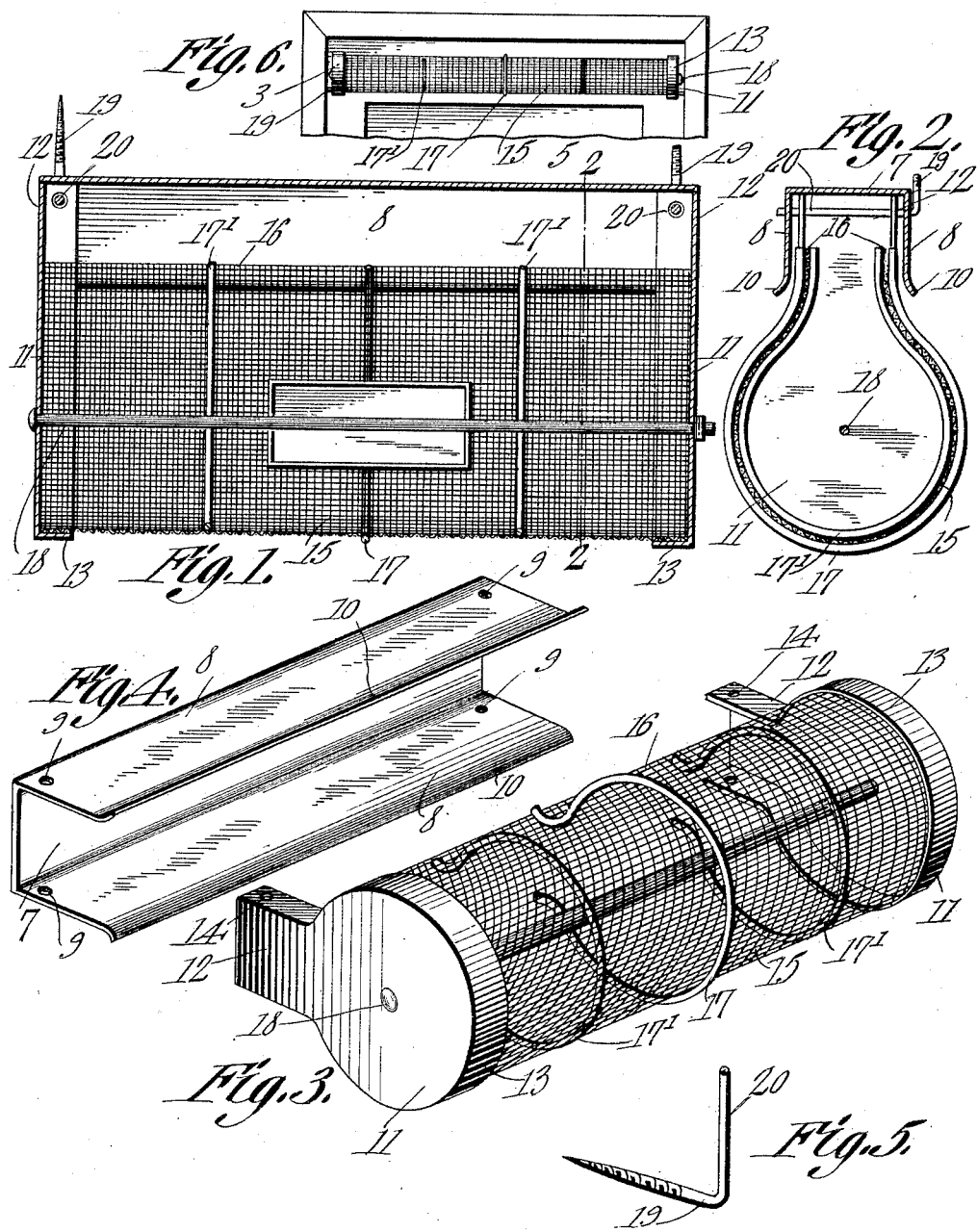

CHAUNCEY W. REYNOLDS, OF COLORADO CITY, COLORADO.

FLY-TRAP.

1,078,465.  Specification of Letters Patent.  Patented Nov. 11, 1913.

Application filed September 26, 1912.  Serial No. 722,543.

*To all whom it may concern:*

Be it known that I, CHAUNCEY W. REYNOLDS, a citizen of the United States, residing at Colorado City, in the county of El Paso and State of Colorado, have invented a new and useful Fly-Trap, of which the following is a specification.

This invention relates to fly traps, and aims to provide an improved device of this character.

It is the object of the present invention to provide a trap comprising two separable parts which when assembled are designed to be supported on a screen door, window or other support, and which when separated open the trap for the purpose of cleaning the parts or destroying the insects, the parts when assembled providing constricted inlet passages for the insects.

It is a further object of the present invention to provide a trap of the character indicated which shall be simple, durable, compact and inexpensive in construction, as well as convenient, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein like reference characters have been employed to denote corresponding parts, and wherein—

Figure 1 is a longitudinal sectional view of the fly trap. Fig. 2 is a sectional view taken on the line 2—2 of Fig. 1. Fig. 3 is a perspective view of one part of the trap. Fig. 4 is a perspective view of the other part of the trap. Fig. 5 is a perspective view of a bracket employed in supporting the trap. Fig. 6 is a front elevation of a modified form of trap as in use.

Referring specifically to the drawings, one part of the trap comprises a channel-shaped back 7, the flanges of which have been designated by the numeral 8 and which have their edges outturned as designated by the numeral 10, the flanges also being provided with apertures 9 at their ends. This back may be readily stamped from sheet metal or otherwise constructed. The other part of the trap embodies a pair of circular heads or ends 11, each of which has an extension 12. Each head 11 and extension 12 thereof is provided with an inturned or inwardly projecting flange 13 along the edges thereof, the said flange being provided with apertures 14 at its ends. A meshed wire fabric or reticulated sheet 15 is bent or curved to conform to the heads 11, the edges 16 being spaced apart. A plurality of wire ribs 17 and 17' are secured by means of solder or otherwise upon the exterior and interior, respectively, of the reticulated casing formed by the fabric 15, at intervals along its length, the ends of the ribs extending to the edges 16. These ribs serve to brace the reticulated casing and to render same more substantial. A stay rod 18 connects the heads 11 and is arranged axially or centrally thereof, the said rod being preferably in the form of a bolt so as to be removable, but it is understood that the ends thereof may be riveted over the outer faces of the heads 11. It will therefore be observed, that the reticulated casing 15 is securely held between the heads 11 in a substantial and convenient manner without the employment of solder or other like securing means and that by removing the stay bolt, the various parts may be detached for purpose of cleaning, repair, or replacement. The heads 11 may also be stamped from suitable sheet metal or otherwise constructed, as well as the back 7.

In assembling the two parts, the extensions 12 of the heads 11 are inserted into the ends of the back 7, the apertures 14 in the flanges 13 registering with the apertures 9 at the respective ends of the back and the edges 16 of the casing projecting within and being spaced from the edges of the flanges 8, so as to provide constricted inlets. The trap may then be supported from a door, window, or other structure, by means of suitable brackets such as shown in Fig. 5 and designated by the numeral 19. The brackets are provided with upstanding fingers 20 over which the respective sets of registering apertures 9 and 14 are adapted to engage. Thus, to support the trap, a pair of the brackets 19 are screw threaded into or otherwise engaged to the support at a suitable distance apart, and the two parts after being assembled are engaged over the upstanding fingers 20 of the brackets. This will not only support the trap, but will retain the two parts of the trap in assembled position, it therefore being apparent, that when the trap is lifted from the brackets, the parts may be separated for the purpose of cleaning the trap or for destroying the insects. When the trap is mounted, the insects may be lured into same by means of suitable bait contained within the reticulated casing, which may be held in a suitable pan or other receptacle within the casing, the insects entering the trap through the constricted inlet provided between the ends 16 of the casing and the edges of the flanges 8. These constricted inlets permit the ready entrance of the insects, but arrest the escape of the insects, the insects being attracted forward inasmuch as the light penetrates the reticulated casing.

This trap may be constructed in various lengths, the form shown in Fig. 6 being much longer than the form shown in Fig. 1, so as to extend across the door, window or the like. It is also understood that any number of the ribs 17 and 17' may be provided for strengthening the casing, it being evident that the ends of the rib 17 on the exterior of the casing in fitting into the flanges 8 serve to space the edges 16 of the fabric from the said flanges 8. It will be noted that the ends of the reticulated fabric being held between the heads, will retain the fabric in position so that the edges thereof will be spaced from the edges of the flanges 8. The rib 17 in having its ends passing within the edges of the flanges 8 merely serves as an expedient for retaining the edges of the fabric in spaced relation relative to the edges of the flanges, the ribs being primarily adapted to brace the fabric and to retain same in position, although they may be eliminated in short traps. The various parts may also be of different designs and proportions as is within the skill of the ordinary mechanic.

From the foregoing, taken in connection with the drawings, the advantages and capabilities of the present trap will be apparent, and it will also be observed, that the objects aimed at have been carried out in a satisfactory manner.

Having thus described the invention, what is claimed as new is:—

1. An insect trap embodying a channel-shaped member, heads having inturned marginal flanges and having reduced extensions fitting in the ends of the said member, means for securing the extensions to the said member, and a reticulated sheet bent to form a casing having its ends fitting within the flanges of the heads and having its edges spaced apart and fitting within the flanges of the channel-shaped member to provide constricted inlets between the edges of the casing and the edges of the channel-shaped member.

2. An insect trap embodying a channel-shaped back, heads having extensions fitting into the ends of the back, the heads and extensions having inturned marginal flanges, a meshed wire fabric bent to conform to the heads and having its ends engaging the heads, the edges of the fabric projecting within and being spaced from the edges of the flanges of the back to provide constricted inlets between the edges and the fabric and flanges, and securing members engaging through the flanges of the back and extensions.

3. An insect trap embodying a channel-shaped back, two heads having extensions fitting into the ends of the back, the heads and extensions having inwardly projecting flanges along their edges, means for securing the extensions to the back, a meshed wire fabric curved to conform to the heads and fitting at its ends within the flanges of the heads so that the edges project within and are spaced from the edges of the flanges of the back to provide constricted inlets between the edges and the fabric and flanges, and a stay rod connecting the heads.

4. An insect trap embodying a channel-shaped back having the edges of its flanges outturned and having apertures in the ends of its flanges, two heads having extensions fitting into the ends of the back, the heads and extensions having inwardly projecting flanges along their edges and the flanges having apertures in their ends registering with the aforesaid apertures, so that the respective sets of apertures may be engaged over suitable supporting brackets, a meshed wire fabric bent to conform to the heads and fitting at its ends within the flanges of the heads so that the edges project within and are spaced from the edges of the flanges of the back to provide constricted inlets between the edges and the fabric and flanges, and an axial stay rod connecting the heads.

5. An insect trap embodying a channel-shaped back having the edges of its flanges outturned and having apertures in the ends of its flanges, two circular heads having extensions fitting into the ends of the back, the heads and extensions having inwardly projecting flanges along their edges and the flanges having apertures in their ends registering with the aforesaid apertures, so that the respective sets of apertures may be engaged over suitable supporting brackets, a meshed wire fabric curved to conform to the heads and fitting at its ends within the flanges of the heads, the edges projecting within and spaced from the edges of the flanges of the back to provide constricted inlets between the edges and the fabric and flanges, an axial stay rod connecting the heads, and ribs secured on the exterior and interior of the fabric at intervals along its length with the ends projecting into the flanges of the back.

In testimony that I claim the foregoing as my own, I have hereto affixed my signature in the presence of two witnesses.

CHAUNCEY W. REYNOLDS.

Witnesses:
J. H. WILSON,
A. B. WILLIAMS.

Copies of this patent may be obtained for five cents each, by addressing the "Commissioner of Patents, Washington, D. C."